United States Patent
Schmidt

(10) Patent No.: US 7,787,851 B2
(45) Date of Patent: Aug. 31, 2010

(54) CIRCUIT ARRANGEMENT WITH RADIO-FREQUENCY MIXER, AND RECEIVER ARRANGEMENT WITH THE CIRCUIT ARRANGEMENT

(75) Inventor: Axel Schmidt, Wunstorf (DE)

(73) Assignee: Infineon Technologies AG, Munich (DE)

( * ) Notice: Subject to any disclaimer, the term of this patent is extended or adjusted under 35 U.S.C. 154(b) by 847 days.

(21) Appl. No.: 11/067,834

(22) Filed: Feb. 28, 2005

(65) Prior Publication Data

US 2005/0197088 A1 Sep. 8, 2005

Related U.S. Application Data

(63) Continuation of application No. PCT/DE03/02639, filed on Aug. 6, 2003.

(30) Foreign Application Priority Data

Aug. 29, 2002 (DE) ................... 102 39 855

(51) Int. Cl.
 *H04B 1/06* (2006.01)
 *H04B 7/00* (2006.01)
(52) U.S. Cl. .............. 455/253.2; 455/234.2; 455/552.1; 330/285
(58) Field of Classification Search ................ 455/341, 455/251.1, 253.2, 241.1, 234.2, 235.1, 552.1; 330/51, 261, 267, 273, 285, 296, 96, 123, 330/130

See application file for complete search history.

(56) References Cited

U.S. PATENT DOCUMENTS

| | | | | |
|---|---|---|---|---|
| 5,724,653 | A | * | 3/1998 | Baker et al. ................. 455/296 |
| 6,026,286 | A | * | 2/2000 | Long .......................... 455/327 |
| 6,029,052 | A | | 2/2000 | Isberg et al. |
| 6,405,025 | B1 | * | 6/2002 | Keski-Mattinen ........... 455/266 |
| 6,980,051 | B2 | * | 12/2005 | Ryynanen et al. ........... 330/254 |
| 7,024,220 | B2 | * | 4/2006 | Forrester ................. 455/552.1 |

FOREIGN PATENT DOCUMENTS

| | | |
|---|---|---|
| DE | 39 03 262 C2 | 11/1989 |
| DE | 198 13 510 A1 | 10/1998 |
| DE | 100 52 711 A1 | 5/2002 |
| WO | WO 02/27953 A1 | 4/2002 |

OTHER PUBLICATIONS

International Search Report, Int'l Application No. PCT/DE03/02639, Int'l Filing Date Aug. 6, 2003.

* cited by examiner

*Primary Examiner*—Edward Urban
*Assistant Examiner*—Christian A Hannon
(74) *Attorney, Agent, or Firm*—Eschweiler & Associates, LLC

(57) ABSTRACT

The invention specifies a circuit arrangement with a radio-frequency mixer (4) in which a plurality of preamplifiers (1, 2, 3) in a receiver have a common output node (6). This node is connected to a common, broadband radio-frequency mixer (4) via common coupling capacitances (41, 42). Switching means (17, 18; 27, 28; 37, 38) can be used to connect and disconnect the preamplifiers (1 to 3), which can be associated with various frequency bands, independently of one another. The present principle can be applied in multiband receivers in mobile radio and allows integration using little chip area with good radio-frequency characteristics.

7 Claims, 2 Drawing Sheets

CIRCUIT ARRANGEMENT WITH RADIO-FREQUENCY MIXER, AND RECEIVER ARRANGEMENT WITH THE CIRCUIT ARRANGEMENT

REFERENCE TO RELATED APPLICATIONS

This application is a continuation of PCT/DE03/02639 filed Aug. 6, 2003, which was not published in English, which claims the benefit of the priority date of German Patent Application No. DE 102 39 855.0, filed on Aug. 29, 2002, the contents of which both are herein incorporated by reference in their entireties.

FIELD OF THE INVENTION

The present invention relates to a circuit arrangement with a radio-frequency mixer and to a receiver arrangement with the circuit arrangement.

BACKGROUND OF THE INVENTION

Particularly in mobile radio, there is the trend toward "multiband" receivers, which are designed to receive radio signals on different frequency bands. In Germany, for example, there are two different frequency bands for the GSM (Global System for Mobile communication) mobile radio standard, namely 900 MHz and 1 800 MHz. While the "D networks" operate in the frequency range around 900 MHz, the "E networks" have an associated frequency range around 1 800 MHz. Mobile radios which can send and receive on both frequency levels are called dual-band appliances.

In order to allow mobile radios to be used worldwide within the context of the globalization of the markets and the high level of user mobility, it is desirable for just one appliance to be provided with access not just to the frequency ranges around 900 and 1 800 MHz but also to other frequency ranges, such as GSM 1 900 and GSM 800, as are used in the USA, for example.

In the reception signal paths of such mobile radio receivers, there is now the problem of designing channel filters, amplifiers etc. to be suitable for these various frequency bands. Multiband receivers are normally designed such that a separate reception path is provided for each reception band. This reception path comprises not only a channel filter but also a specially adapted low noise preamplifier, and also a separate down-conversion frequency mixer.

The documents WO 02/27953, U.S. Pat. No. 6,029,052 and U.S. Pat. No. 6,405,025 each describe different embodiments of receivers. Each receiver contains a plurality of parallel receiver paths with a respective low noise amplifier. The outputs of the amplifiers, which are isolated from one another, are coupled to a jointly used radio-frequency mixer. Each amplifier is designed to amplify a signal predetermined by a mobile radio standard.

A drawback of such a receiver architecture is the relatively high component complexity and the associated area involvement for integrating such circuits.

SUMMARY OF THE INVENTION

The present invention includes a circuit arrangement with a radio-frequency mixer and also a receiver arrangement that includes this circuit arrangement. The circuit arrangement and the receiver can be integrated on a smaller area and nevertheless has good radio-frequency properties.

In accordance with an aspect of the present invention, a circuit arrangement with a radio-frequency mixer is provided. The circuit arrangement, having:

the radio-frequency mixer with a first input, with a second input and with an output, a first preamplifier with an input and with an output, which is coupled to the first input of the radio-frequency mixer, a means for turning on and off the first preamplifier, which means is coupled to the first preamplifier, a second preamplifier with an output, which is connected to the output of the first preamplifier to form a common output node, and a means for turning on and off the second preamplifier, which means is coupled to the second preamplifier.

In line with the present principle, a common radio-frequency mixer can be used which is actuated by different reception paths designed for various frequency bands. This can reduce the chip area requirement of a multiband receiver based on a circuit arrangement of this type. The preamplifiers in the present circuit arrangement have a common output which is coupled to the common radio-frequency mixer.

It is in line with the present principle for it to be possible to dispense with providing multiband receivers with a separate radio-frequency mixer for each reception path for the purpose of useful signal processing.

The common output node of the preamplifiers is coupled to the radio-frequency mixer, such as via a coupling capacitance.

The common output node and the common radio-frequency mixer also significantly reduce the capacitive load on the respective preamplifier which is turned on, which improves the radio-frequency characteristics.

The means for turning on and off the preamplifiers advantageously allow these preamplifiers to be turned on and off independently of one another and according to the desired reception band.

The input transistors in the preamplifiers can each be connected up as diodes which can be turned on and off.

The preamplifiers can have not only a common output node but also a common electrical load, which may be in the form of a current source connected to supply potential.

In another aspect of the invention, the first and second preamplifiers may have been adapted to suit the special requirements of the respective frequency band for which they are intended to be used.

The radio-frequency mixer is optionally in the form of a broadband mixer.

The preamplifiers are can be in the form of low noise preamplifiers, referred to as LNAs (Low Noise Amplifier).

It is naturally within the scope of the invention for the present principle to be applied to arrangements containing three or more preamplifiers. In this case, all of the preamplifiers have a common output node. Typically, each preamplifier is associated with one frequency band and/or with one modulation method.

In accordance with another aspect of the present invention, a receiver arrangement comprising the circuit arrangement of above is disclosed and comprises:

a means for inputting a radio-frequency signal, a first reception path having a first bandpass filter with an input, which is coupled to the means for inputting a radio-frequency signal, and with an output and also having the first preamplifier, whose input is coupled to the output of the first bandpass filter, and a second reception path having a second bandpass filter with an input, which is coupled to the means for inputting a radio-frequency signal, and with an output and also having the second preamplifier, whose input is coupled to the output of the second bandpass filter.

In line with the proposed principle, a dual-band receiver or multiband receiver contains two reception paths whose inputs can be coupled to a common antenna or to a respective associated, separate antenna. Instead of the antenna, it is also possible to provide another means for inputting a radio-frequency signal.

The reception paths each have a preamplifier, and the two preamplifiers have a common output node. The common output node is again coupled to a common down-conversion frequency mixer.

In addition to the advantages which have already been explained, implementing the circuit arrangement with a radio-frequency mixer based on the present principle in a receiver arrangement has the advantage that the two reception paths can be adapted, for example in terms of the bandpass filters, to suit the respective associated frequency band exactly and with a high level of selectivity.

Similarly, the preamplifiers which are connected downstream of the bandpass filters may also be adapted to suit the respective associated reception band and may accordingly be in different forms. Despite this advantageous adaptability of the components which are crucial for channel selection, the present principle can nevertheless be used to save a significant amount of chip area by virtue of a common down-conversion frequency mixer being used.

Since further coupling capacitances associated with each preamplifier can be dispensed with in the case of the described, preferred coupling of the common output node to the mixer input via a coupling capacitance, an additional improvement in the radio-frequency characteristics of the dual-band receiver is obtained.

In line with another aspect, a control device is provided which can use the means for turning on and off the preamplifiers to connect and disconnect said preamplifiers independently of one another. Of the plurality of preamplifiers, no more than one is on at the same time. This achieves a further noise improvement, and also reduces the power consumption of the receiver as a whole.

It is within the scope of the invention for both the circuit arrangement with a radio-frequency mixer and the receiver arrangement with the circuit arrangement to be developed by providing third, fourth or even more preamplifiers which are each designed to be able to be connected and disconnected independently of one another. This allows the dual-band receiver to be easily developed as a triband receiver or generally as a multiband receiver.

Further details and refinements of the present invention are disclosed.

BRIEF DESCRIPTION OF THE DRAWINGS

The invention is explained in more detail below using a plurality of exemplary embodiments with reference to drawings, in which.

DETAILED DESCRIPTION OF THE INVENTION

Figure 1:
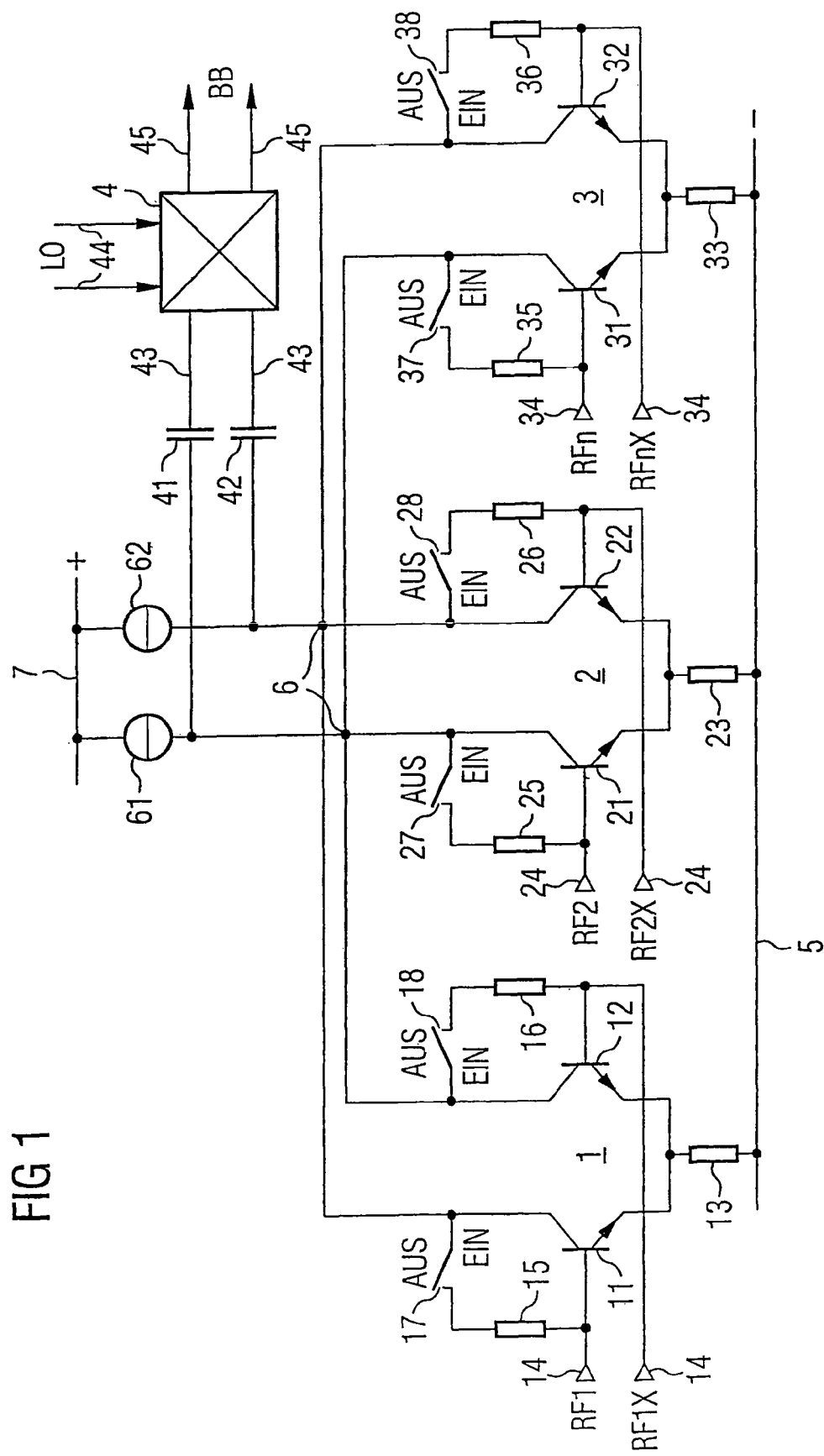
FIG. 1 shows an exemplary embodiment of a circuit arrangement with a radio-frequency mixer based on the present principle, to which three preamplifiers are connected at the input.

The present invention will now be described with reference to the drawings wherein like reference numerals are used to refer to like elements throughout. The illustrations and following descriptions are exemplary in nature, and not limiting. Thus, it will be appreciated that variants of the illustrated systems and methods and other such implementations apart from those illustrated herein are deemed as falling within the scope of the present invention and the appended claims.

FIG. 1 shows three preamplifiers 1 to 3 with a common output node 6 to which a common, broadband radio-frequency mixer 4 is connected.

The first, second and third preamplifiers 1 to 3 are in the form of low noise preamplifiers (LNA) and are each designed using balanced circuitry. Each preamplifier 1 to 3 comprises two emitter-coupled NPN bipolar transistors 11, 12; 21, 22; 31, 32. The common emitter node of the amplifier transistors 11, 12; 21, 22; 31, 32 connected to one another in pairs is connected to a common reference potential connection 5 via a respective resistor 13, 23, 33. Each preamplifier 1, 2, 3 has a separate radio-frequency input 14, 24, 34, with two respective input terminals, a respective one of which is connected to a respective associated base connection of an amplifier transistor 11, 12; 21, 22; 31, 32. The radio-frequency inputs 14, 24, 34 can be supplied with a respective differential signal RF1, RF1X; RF2, RF2X; RFn, RFnX. These inputs 14, 24, 34 can have respective reception signal paths of a radio receiver connected to them, which are designed for different frequency bands or modulation methods. The collector connections of the transistors 11, 12; 21, 22; 31, 32 are connected to one another in respective pairs at a common output node 6, that is to say that the collector connections of the transistors 11, 21, 31 are connected to one another at one node and the collector connections of the transistors 12, 22, 32 are connected to one another at a further circuit node which, together with the first node, forms the balanced output node 6 of the preamplifiers 1 to 3.

In order to turn on and off the preamplifiers 1 to 3 independently of one another, a respective path is provided between the base connection and the collector connection of the transistors 11, 12; 21, 22; 31, 32, which path respectively comprises a series circuit comprising a resistor 15, 16, 25, 26, 35, 36 and a switch 17, 18, 27, 28, 37, 38. The two switches 17, 18; 27, 28; 37, 38 associated with a preamplifier 1, 2, 3 are turned on and off together in respective pairs. When the switches are in the open state, the respectively associated preamplifier 1, 2, 3 is off. In order to turn on one of the preamplifiers 1 to 3, the switch pair 17, 18; 27, 28; 37, 38 associated with it is closed. The two other switch pairs remain open. The balanced output node 6, which is common to all of the preamplifiers 1 to 3, is connected to a supply potential connection 7 via a respective current source 61, 62 which is common to all of the preamplifiers.

In addition, the balanced output 6 is connected to the first input 43 of the radio-frequency mixer 4, which input is designed for differential signal transmission, via a respective series capacitor 41, 42. A second input 44 of the radio-frequency mixer 4 is designed to supply a local oscillator signal containing signal components which have been phase-shifted through 90° with respect to one another. At the output of the mixer 4, which is provided with reference symbol 45 and is likewise of balanced design, it is possible to tap off a baseband signal BB or an intermediate-frequency signal, depending on the architecture of the receiver.

In the present circuit arrangement, the preamplifiers 1 to 3, which are each associated with different reception paths, have a common output 6 which is connected to the associated mixer 4. There are thus advantageously just two coupling capacitances 41, 42 per mixer input 43. This in turn means that there is a particularly small capacitive load at the output of the respective active low noise preamplifier 1 to 3. The circuit therefore has improved radio-frequency characteristics.

To be able to turn on and off the preamplifiers 1 to 3 independently of one another, the input transistors 11, 12, 21, 22, 31, 32 are connected up as switchable diodes.

The circuit arrangement from FIG. 1 may advantageously be used in a triband receiver, for example. A triband receiver of this type may be used to process the mobile radio standards GSM 900, GSM 1 800 and GSM 1 900, for example or other frequency ranges.

The principle described may naturally also be applied when there are just two preamplifiers or may alternately be extended to any number of preamplifiers and reception paths.

In alternative embodiments, it is also possible for current sources to be provided instead of the resistors 13, 23, 33.

Instead of the current sources 61, 62, any other, even complex, electrical loads may be provided in alternative embodiments.

Between the collector connections of the differential amplifier transistors and the common output node 6 there may be a respective cascade transistor. This achieves a further increase in insulation.

In alternative embodiments, an additional amplifier stage may be added between the low noise preamplifiers 1, 2, 3 and the mixer 4.

Figure 2:
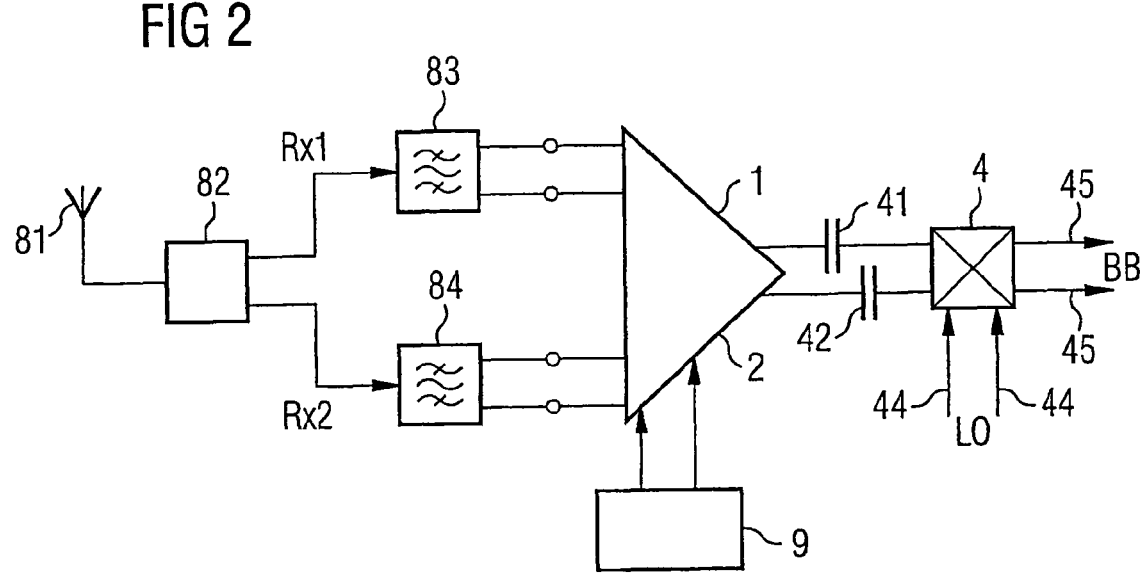
FIG. 2 shows an exemplary dual-band receiver with the connection of preamplifiers and radio-frequency mixers in two reception paths.

FIG. 2 shows, by way of example, the application of the principle from FIG. 1 in a dual-band receiver with two reception paths RX1, RX2. In that case, an antenna 81 has a coupling element 82 connected to it, with a first output, which is connected to a first surface acoustic wave filter 83, and a second output, which is connected to a second surface acoustic wave filter 84. The surface acoustic wave filters 83, 84 are used to select the respective frequency band associated with the reception path RX1, RX2 and to suppress unwanted frequency components. At the outputs of the filters 83, 84, there is a respective preamplifier 1, 2, such as the preamplifiers shown and connected to one another in FIG. 1. If the preamplifiers of FIG. 1 are employed, the switches 17, 18; 27, 28 1, 2 have their control inputs connected to an actuation circuit 9, which activates the respective desired preamplifier. The outputs of the preamplifiers 1, 2 are connected via coupling capacitances 41, 42 to a first input of the radio-frequency mixer 4, which is in the form of a down-conversion mixer. The second input 44 is used to supply a local oscillator signal LO. At the output 45, it is possible to tap off a baseband signal BB.

The preamplifiers 1, 2 can employ different frequency ranges and/or modulation methods. For example, the preamplifiers 1,2 can employ frequency ranges such as, about 800 to 900 MHz, about 880 to 960 Mhz, about 1700 to 1900 Mhz, about 1850 to 2000 Mhz, and the like. As another example, the preamplifiers 1,2 can employ frequency ranges for different communication standards such as GSM 900, GSM 1800, GSM 1900, GSM 800, and the like. It is noted that the present invention is not limited to a specific group or range of frequencies.

The chip area saving which is possible with the present principle is clear to see. In the illustration in FIG. 2, just one common down-conversion frequency mixer 4 is required, despite the option of being able to process various frequency bands. The common output node 6 of the preamplifiers 1, 2 means that the capacitive load governed by the coupling capacitances 41, 42 is also relatively small.

It goes without saying that it is within the scope of the invention to apply the principle shown also to receivers with more than two frequency bands, for example to triband receivers.

Instead of the circuit implementation shown in FIG. 1 using differential, bipolar circuitry, it is also possible to implement it using "single-ended circuitry" and/or using CMOS circuitry within the scope of the invention.

Although the invention has been illustrated and described above with respect to a certain aspects and implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary implementations of the invention. In this regard, it will also be recognized that the invention may include a computer-readable medium having computer-executable instructions for performing the steps of the various methods of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", "with" and variants thereof are used in either the detailed description or the claims, these terms are intended to be inclusive in a manner similar to the term "comprising". Also, the term "exemplary" as utilized herein simply means example, rather than finest performer.

LIST OF REFERENCE SYMBOLS

1 Preamplifier
2 Preamplifier
3 Preamplifier
4 Mixer
5 Reference potential connection
6 Output node
7 Supply potential connection
9 Control circuit
11 Transistor
12 Transistor
13 Resistor
14 Input
15 Resistor
16 Resistor
17 Switch
18 Switch
21 Transistor
22 Transistor
23 Resistor
24 Input
25 Resistor
26 Resistor
27 Switch
28 Switch
31 Transistor
32 Transistor
33 Resistor
34 Input
35 Resistor
36 Resistor
37 Switch 38 Switch
41 Capacitance
42 Capacitance
43 Input
44 Input
45 Output
61 Current source
62 Current source
81 Antenna
82 Coupling element
83 Bandpass filter
84 Bandpass filter
BB Baseband
LO Local oscillator signal
RX1 Reception path
RX2 Reception path
RF1 Radio-frequency signal
RF1X Radio-frequency signal
RF2 Radio-frequency signal
RF2X Radio-frequency signal
RFn Radio-frequency signal
RFnX Radio-frequency signal

What is claimed is:

1. A circuit arrangement with a radio-frequency mixer comprising:
   the radio-frequency mixer having a first input, a second input, and an output;
   a first preamplifier having an input and an output;
   a first switching mechanism that turns on and off the first preamplifier;
   a second preamplifier having an input and an output;
   a common output node connected concurrently to the output of the first preamplifier and the output of the second preamplifier; and
   a second switching mechanism that turns on and off the second preamplifier;
   wherein the common output node is coupled to the first input of the radio-frequency mixer and also receives a supply voltage;
   wherein the second preamplifier comprises a common-emitter transistor, with a base connection connected to the input, with a collector connection connected to the common output node, and with an emitter connection coupled to a reference potential connection;
   wherein the second switching mechanism is in the form of a switch with a first connection coupled to the base connection of the common-emitter transistor and a second connection coupled to the emitter connection of the common-emitter transistor.

2. The arrangement of claim 1, wherein the common output node is coupled to the first input of the radio-frequency mixer via a coupling capacitance.

3. The arrangement of claim 1, wherein the first preamplifier comprises a common-emitter transistor, with a base connection connected to the input, with a collector connection connected to the common output node, and with an emitter connection coupled to a reference potential connection.

4. The arrangement of claim 1, wherein the first preamplifier and the second preamplifier comprise balanced circuitry.

5. The arrangement of claim 1, wherein the common output node receiving the supply voltage comprises the common output node being operatively coupled to the supply voltage via a current source.

6. The arrangement of claim 1, wherein the first switching mechanism and the second switching mechanism each comprise a first switch and a second switch configured to operate together to turn the first preamplifier or the second preamplifier on or off.

7. A circuit arrangement with a radio-frequency mixer comprising:
   the radio-frequency mixer having a first input, a second input, and an output;
   a first preamplifier having an input and an output;
   a first switching mechanism that turns on and off the first preamplifier;
   a second preamplifier having an input and an output;
   a common output node connected concurrently to the output of the first preamplifier and the output of the second preamplifier; and
   a second switching mechanism that turns on and off the second preamplifier;
   wherein the first preamplifier comprises a common-emitter transistor, with a base connection connected to the input, with a collector connection connected to the common output node, and with an emitter connection coupled to a reference potential connection,
   wherein the common output node is coupled to the first input of the radio-frequency mixer and also receives a supply voltage, and
   wherein the first switching mechanism is in the form of a switch with a first connection coupled to the base connection of the common-emitter transistor and a second connection coupled to the emitter connection of the common-emitter transistor.

* * * * *